United States Patent
Misikangas et al.

(10) Patent No.: US 7,349,683 B2
(45) Date of Patent: Mar. 25, 2008

(54) SEQUENCE-BASED POSITIONING TECHNIQUE

(75) Inventors: Pauli Misikangas, Helsinki (FI); Petri Myllymäki, Helsinki (FI)

(73) Assignee: Ekahau Oy, Helsinki (FI)

( * ) Notice: Subject to any disclaimer, the term of this patent is extended or adjusted under 35 U.S.C. 154(b) by 304 days.

(21) Appl. No.: 10/999,191

(22) Filed: Nov. 30, 2004

(65) Prior Publication Data

US 2005/0136944 A1    Jun. 23, 2005

Related U.S. Application Data

(63) Continuation of application No. PCT/FI03/00412, filed on May 27, 2003.

(30) Foreign Application Priority Data

May 31, 2002    (FI) .................................. 20021043

(51) Int. Cl.
*H04M 11/04*    (2006.01)

(52) U.S. Cl. .............................. 455/404.2; 455/456.1; 455/440

(58) Field of Classification Search ............. 455/456.5, 455/404.2, 456.1, 440
See application file for complete search history.

(56) References Cited

U.S. PATENT DOCUMENTS

| | | |
|---|---|---|
| 6,269,246 B1 | 7/2001 | Rao et al. |
| 6,393,294 B1 | 5/2002 | Perez-Breva et al. |
| 6,782,265 B2 | 8/2004 | Perez-Breva et al. |

FOREIGN PATENT DOCUMENTS

| | | |
|---|---|---|
| EP | 0 359 287 A2 | 9/1989 |
| EP | 1 006 481 A2 | 6/2000 |
| EP | 1 014 281 A2 | 6/2000 |

OTHER PUBLICATIONS

Mangold, Stefan et al., "Applying Pattern Recognition Techniques based on Hidden Markov Models for Vehicular Position Location in Cellular Networks," IEEE VTS 50th Vehicular Technology Conference, p. 780-784, ( 1999).

Mark, Brian L. et al., "Robust Mobility Tracking for Cellular Networks," IEEE International Conference on Communications, p. 445-449, ( 2002).

*Primary Examiner*—Duc M. Nguyen
*Assistant Examiner*—Wayne Cai
(74) *Attorney, Agent, or Firm*—Barnes & Thornburg, LLP

(57) ABSTRACT

A target device's location is estimated by a location estimation module (LEM) that comprises a probabilistic model (PM) for a plurality of sample points, each of which comprises a sample location and an expected distribution of signal values at that sample point. The location estimation module (LEM) makes a sequence (OS) of observations $o_n$, $n=1, 2, 3 \ldots$, of signal values. Each observation corresponds to a respective location $q_n$ along the target device's path. The sequence of observations and the respective location constitute a hidden Markov model. The module estimates the target device's location $q_n$ based on the probabilistic model (PM) and the sequence of observations, wherein the sequence of observations comprises one or more future observations $o_{n+m}$ for which m is a positive integer. In other words, the target device's location is estimated, at least partially, based on knowledge of its future.

18 Claims, 2 Drawing Sheets

SEQUENCE-BASED POSITIONING TECHNIQUE

This is a continuation of International Application No. PCT/FI03/00412, filed May 27, 2003, which claims priority from Finnish Application No. 20021043, filed May 31, 2002, the contents of both of which are incorporated herein by reference.

BACKGROUND OF THE INVENTION

The invention relates generally to a positioning technique in which a target device's location is estimated on the basis of a sequence of observations on the target device's wireless communication environment. FIG. 1 schematically illustrates an example of such a positioning technique. A target device T communicates via base stations BS via a radio interface RI. In this example, the communication is assumed to be radio communication. The target device T. observes signal values at the radio interface RI. The observations O are applied to a probabilistic model PM that models the target device's wireless communication environment and produces a location estimate LE. As used herein, a target device is a device whose location is to be determined. The target device communicates via signals in a wireless environment, and signal values in the wireless environment are used for determining the target device's location. For example, the target device may be a data processing device communicating in a wireless local-area network (WLAN). The data processing device may be a general-purpose laptop or palmtop computer or a communication device, or it may be a dedicated test or measurement apparatus such as a hospital instrument connected to the WLAN. A location, as used herein, is a coordinate set of one to three coordinates. In some special cases, such as tunnels, a single coordinate may be sufficient but in most cases the location is expressed by a coordinate pair (x, y or angle/radius).

More particularly, the invention relates to a positioning technique that is based on a hidden Markov model. FIG. 2 schematically illustrates a hidden Markov model. The model consists of locations, transitions between the locations and observations made at the locations. In the example shown in FIG. 2, the target device moves along a path of which five locations $q_{t-2}$ through $q_{t+2}$ are shown. More formally, $q_t$ defines the location distribution at time t, so that $P(q_t=s)$ is the probability for the target device being at location s at time t. However, because a location distribution can easily be converted to a single location estimate, the shorthand notation "location q" will be used to refer to a location distribution q.

The locations along the target device's path can be called path points. The target device communicates via signals in a wireless environment, and signal values in the wireless environment are used for determining the target device's location.

A practical example of the target device is a data processing device communicating in a wireless local-area network (WLAN) or a cellular radio network. The data processing device may be a general-purpose laptop or palmtop computer or a communication device, or it may be a dedicated test or measurement apparatus such as a hospital instrument connected to the WLAN. A signal value, as used herein, is a measurable and location-dependent quantity of a fixed transmitter's signal. For example, signal strength and bit error rate/ratio are examples or measurable and location-dependent quantities.

The word 'hidden' in the hidden Markov model stems from the fact that we are primarily interested in the locations $q_{t-2}$ through $q_{t+2}$ but the locations are not directly observable. Instead we can make a series of observations $o_{t-2}$ through $o_{t+2}$ on the basis of the signal values but there is no simple relationship between the observations $o_{t-2} \ldots o_{t+2}$ and locations $q_{t-2} \ldots q_{t+2}$. (Note that the straight arrows through the locations $q_{t-2}$ through $q_{t+2}$ are not meant to imply that the target devices moves along a straight path or with a constant speed, or that the observations are made at equal intervals.)

A problem underlying the invention derives from the hidden Markov model: we cannot observe a variable that has a monotonous relationship with distance or location. Instead the positioning method is based on observations of signal values. It is possible for two or more locations to have near-identical sets of signal values, and a location estimate may be grossly inaccurate.

BRIEF DESCRIPTION OF THE INVENTION

An object of the invention is to provide a method and an apparatus for implementing the method so as to alleviate the above disadvantages. In other words, it is an object of the invention to reduce the uncertainty of a positioning technique that is based on a probabilistic model of expected signal values. The object of the invention is achieved by the methods and equipment which are characterized by what is stated in the independent claims. The preferred embodiments of the invention are disclosed in the dependent claims.

The invention is based on the idea of using the target device's future observations to reduce the uncertainty concerning the target device's location. At first sight, this idea sounds absurd because at any given time, the target device's future observations are not known. Thus an apparent limitation of the invention is that it is only applicable to observations that do have at least one future. observation. In other words, the invention cannot directly reduce the uncertainty concerning the target device's most recent observation, but the invention is partially based on the surprising discovery that there are many applications that benefit from reducing the uncertainty concerning the target device's past observations. For example, the invention can be used to track customers' paths in a shop by attaching suitable target devices to shopping carts. Such information can be useful to design the placement of goods within the shop. Assume that a customer's path begins and ends at the points where the customer takes and leaves, respectively, the shopping cart. Thus the store owner is not interested in determining the most recent locations accurately because all paths end at the checkout points. On the other hand, the store owner is interested in determining the customers' paths inside the shop, and the most recent observations can be used to reduce the uncertainty concerning prior locations within the shop.

A method according to the invention comprises the following steps:
1. maintaining a probabilistic model for a plurality of sample points, each sample point comprising a sample location and an expected distribution of signal values at that sample point;
2. making a sequence of observations $o_n$, n=1, 2, 3 ..., of signal values wherein each observation corresponds to a respective location $q_n$ along the target device's path, wherein the sequence of observations and the respective location constitute a hidden Markov model;
3. estimating the target device's location $q_n$ based on the probabilistic model and a set of observations, wherein the set of observations comprises at least one observation $o_{n+m}$ such that m is a positive integer.

A sample point is a point of the probabilistic model, that is, a point for which signal value distributions are known either by calibration (physical measurements) or by simulations or theoretical calculations. Sample points may also be obtained by interpolation or extrapolation from other known locations.

Positioning accuracy can be further improved by making use of one or more past observations. The past and future observations are preferably combined by two-way recursion. This means that, if time is shown as advancing from left to right, past observations are taken into account by left-to-right (forward) recursion and future observations by right-to-left (backward) recursion.

If the invention is to be used in real-time positioning, a delay of at least one observation must be tolerated. To minimize the delay in real-time positioning, the number of future observations should be kept small. As used herein, real-time positioning means that the target device is positioned as soon as technically possible, even if there is a delay of one or a few observations.

BRIEF DESCRIPTION OF THE DRAWINGS

In the following the invention will be described in greater detail by means of preferred embodiments with reference to the attached drawings, in which FIG. 1 schematically illustrates a positioning technique.

DETAILED DESCRIPTION OF THE INVENTION

A reference is again made to FIG. 2 that shows a series of signal value observations $o_{t-2}$ through $o_{t+2}$. For each of the observations, there is a respective location $q_{t-2}$ through $q_{t+2}$ along the target device's path. This relationship is shown by arrow 21. The direction of the arrow 21 implies that the location $q_t$ determines the signal values comprised in the observation $o_t$ but the converse is not true. In other words, we can only directly observe the signal values and there is no simple relationship from the observations $o_t$ to the corresponding locations $q_t$. On open sea, a signal value decreases predictably with the distance from the transmitter but in virtually all environments in which the invention will be used, a direct path from the transmitter is frequently blocked, and when it is not, it is not the only path taken by transmissions. Depending on phase, transmissions via multiple paths may combine constructively or destructively. Thus the relationship from location to signal values is far from monotonous, and there are likely to be several locations that share some signal values. Making observations on several channels is one way of reducing uncertainty concerning the target device's location.

Figure 3:
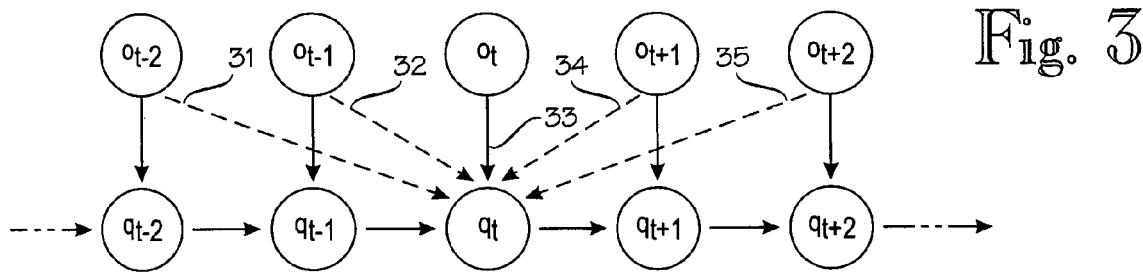
FIG. 3 illustrates the principle of the invention.

FIG. 3 illustrates the principle of the invention. According to the invention, the uncertainty concerning the target device's current location can be further reduced by using knowledge of the target device's future. As stated earlier, a location that has a known future only exists in the past, but the invention is partially based on the discovery that there are many situations and applications where the past is of interest. Assume that we wish to determine the target device's location at time t, that is the location $q_t$. Arrow 33 indicates the relationship from the observation $o_t$ that corresponds to location $q_t$. Normally, observation $o_t$ is the best single observation for determining location $q_t$. Note that a single 'observation' may comprise, and typically does comprise, several signal value measurements from one or more channels. In a probabilistic model, the idea is to measure the probability distribution of a signal value, and if there is any overlap in signal values in various locations, the locations cannot be determined on the basis of a single measurement per location. Instead, each observation must comprise a plurality of measurements in order to determine a probability distribution.

Figure 1:
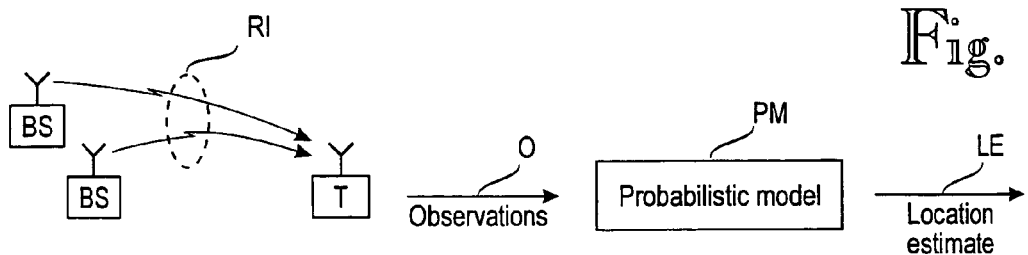
Figure 2:
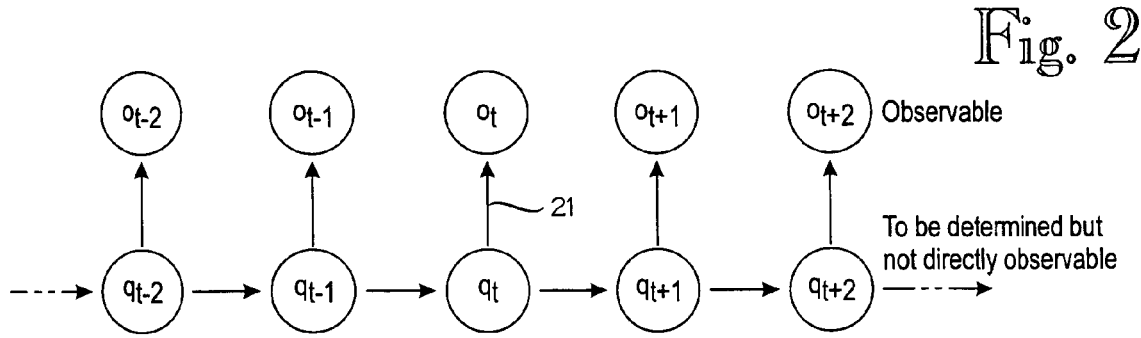
FIG. 2 illustrates a hidden Markov model.

It should also be understood that in FIGS. 1 and 2, time is quantified. This means that a target device that has a single radio receiver may only observe one channel at any point of time, but the radio receiver can be re-tuned to a different channel in milliseconds, whereas the observations $o_{t-2} \ldots o_{t+2}$ are typically separated by at least a hundred milliseconds. The interval between observations can be selected based on the a typical target device's speed. Thus a single observation can comprise signal values from several channels even if a radio receiver has to be re-tuned between channels.

According to the invention, uncertainty concerning the target device's location $q_t$ can be reduced by using not only the current observation $o_t$ but one or more future observations $o_{t+m}$, where m is a positive integer. Two future observations $o_{t+1}$ and $o_{t+2}$ are denoted by arrows 34 and 35, respectively. Naturally, prior observations $o_{t-2}$ and $o_{t-1}$ can also be used to reduce positioning uncertainty, as shown by arrows 31 and 32, respectively.

The invention can be used to estimate the target device's location and/or its path. The two applications (location and path estimation) can be formally expressed as follows. In location estimation, we wish to maximize the probability of a single location given a sequence of observations. Formally stated, we wish to maximize $p(q_t|O_1^T)$. (Alternatively, we wish to determine a location having the smallest expected error; for instance location estimate may be a probability-weighted average of several locations.) In path estimation, we wish to maximize the probability of a path (a sequence of locations) given a sequence of observations. Formally stated, we wish to maximize $p(q_1^T|O_1^T)$. (Alternatively, we may wish to determine a path having the smallest expected error.) The difference between the two applications is that in location estimation, each location is estimated separately (although based on a sequence of observations). Thus a path of consecutive locations may penetrate walls or be otherwise very unlikely, if that path is the one that maximizes the probabilities of individual locations. In path estimation, the most probable path is selected. Path estimation can be accomplished by determining transition probabilities between locations and determining the path that maximizes a combination of individual location probabilities and transition probabilities such that a most probable path is determined.

Note that FIGS. 2 and 3 represent first-order hidden Markov models but the inventive techniques are applicable to hidden Markov models of any order.

Figure 4:
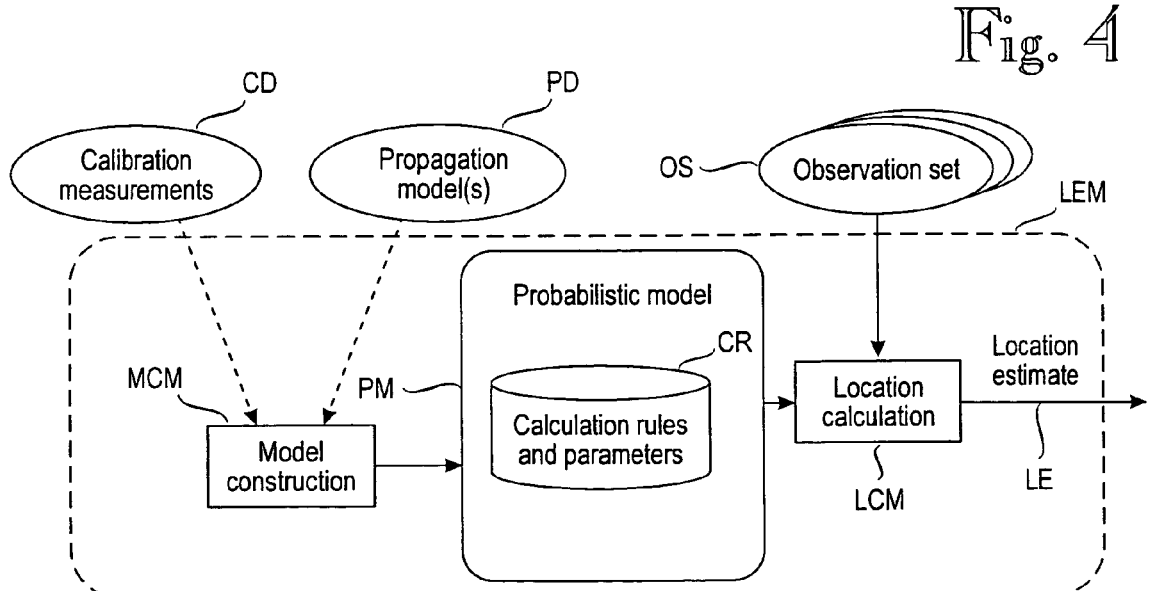
FIG. 4 shows a location estimation module LEM for estimating the target device's location based on signal values at the radio interface RI.

FIG. 4 is a block diagram of an exemplary location estimation module LEM for estimating the target device's location based on signal values at the radio interface RI. FIG. 4 shows a compact location estimation module LEM, but more distributed embodiments are equally possible. An essential feature of the location estimation module is a probabilistic model PM of the target device's wireless environment, the probabilistic model being able to predict the target device's location given a plurality of observations from the radio interface. In this example, the probabilistic model PM is built and maintained by a model construction module MCM. The model construction module MCM builds and maintains the probabilistic model on the basis of calibration data CD or propagation data PD in the form of one or more propagation models, or any combination thereof. Calibration data CD is the result of physically measuring signal values at known locations (or determining the coordinates of those locations if they are not known by other means). Optionally, the calibration data records may also comprise the time at which the measurement was made, in case the signal parameters vary with time. Instead of the calibration data CD, or in addition to them, one or more propagation models PD can be used to model the radio interface RI. The propagation models can be constructed by techniques that are analogous to ray-tracing techniques for visual simulation. The locations at which calibration measurements are collected are called calibration points. The calibration data CD comprises data records each of which comprises the location of the calibration point in question and the set of signal parameters measured at that calibration point. The location can be expressed in any absolute or relative coordinate system. In special cases, such as trains, highways, tunnels, waterways or the like, a single coordinate may be sufficient, but normally two or three co-ordinates will be used.

There is also a location calculation module LCM for producing a location estimate LE on the basis of the target device's observation set OS and the probabilistic model PM. For instance, the location calculation module can be implemented as a software program being executed in a laptop or palmtop computer. Technically, the 'measurements' and 'observations' can be performed similarly, but to avoid confusion, the term 'measurement' is generally used for the calibration measurements, and the signal parameters obtained at the current location of the target device are called 'observations'. The target device's most recent set of observations is called current observations.

Figure 5A:
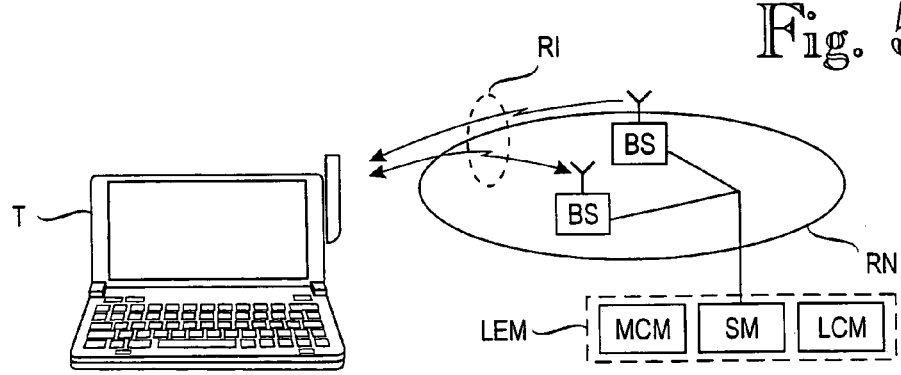
FIGS. 5A and 5B are block diagrams illustrating typical target devices whose location is to be determined.

FIG. 5A is a block diagram illustrating a typical target device T whose location is to be determined. In this example, the target device T is shown as a portable computer that communicates via a radio network RN. For example, the radio network can be WLAN (wireless local-area network) network. In the embodiment shown in FIG. 5A, the location estimation module LEM comprising the probabilistic model PM is not installed in the target device T. As a result, the target device T must send its observation set OS to the location estimation module LEM via one or more of the base station BS. it is connected to. The location estimation module LEM returns the target device its location estimate LE via the radio interface RI.

Figure 5B:
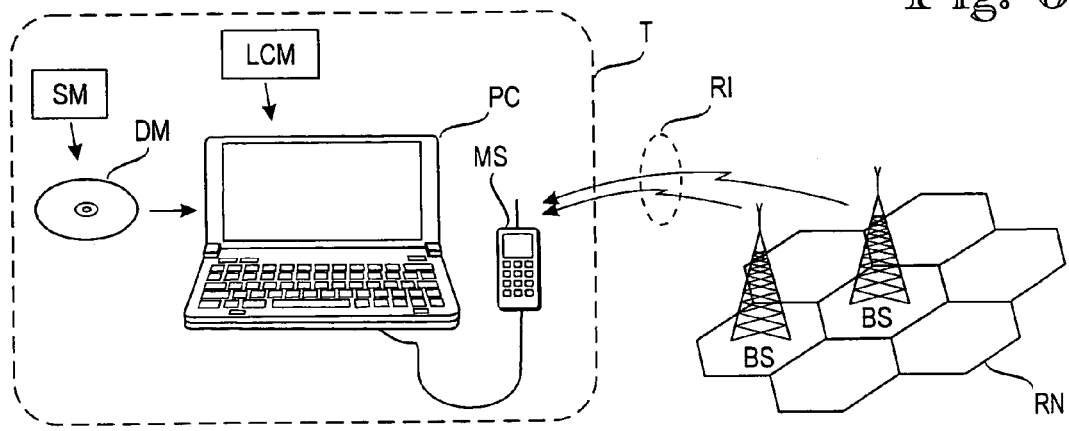

FIG. 5B shows an alternative embodiment in which the target device's attached computer PC receives a copy of the probabilistic model PM on a detachable memory DM, such as a CD-ROM disk, and the target device T is able to determine its own location without transmitting anything. As a yet further alternative (not shown separately), the attached computer PC may receive the probabilistic model via an Internet (or any other data) connection to the location estimation module LEM. Wideband mobile stations can receive the probabilistic model via the radio interface RI. A hybrid of the technologies may also be used such that the receiver receives an initial probabilistic model via a wired connection or on the detachable memory, but later updates to the model are sent via the radio interface.

Figure 6:
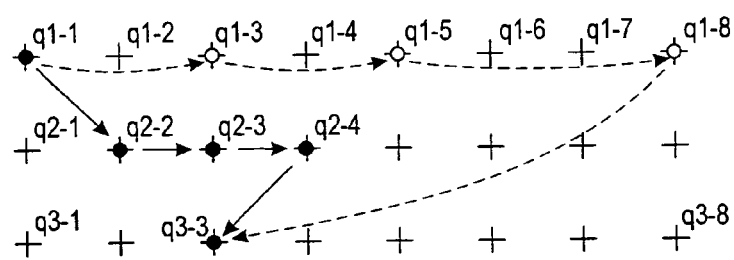
FIG. 6 shows a simple embodiment to reduce positioning uncertainty.

FIG. 6 illustrates a simple embodiment to reduce positioning uncertainty. This embodiment works as follows. The location space is quantified to discrete locations, of which locations q1-1 through q3-8 are shown as crosses in FIG. 6. A probable path taken by a target device is indicated by black circles at locations q1-1, q2-2, q2-3, q2-4 and q3-3. Assume that the target device's second observation is such that location q1-3 is possible alternative to location q2-2. In other words, a single observation is insufficient to determine whether the target device was at q2-2 or q1-3 when the second observation was made. Similarly, location q1-5 is a possible alternative to location q2-3 and location q1-8 is a possible alternative to location q2-4. However, we know that the fifth observation can only be explained by location q3-3. For example, the target device's location at q3-3 can be determined by other means, or location q3-3 is the only location that has the signal values of the fifth observation. In the example shown in FIG. 6 we can rule out location q1-8 because the transition to the known location q3-3 would require a speed that the target device cannot achieve. Note that none of the alternative locations q1-3, q1-5 and q1-8 can be excluded by virtue of its past observations but each of these locations can be ruled out by virtue of its future. Location q1-8 can be directly ruled out because of the impossibly high speed required to reach location q3-3 for the fifth observation. Location q1-5 can be ruled out because it leads to an impossible location q1-8, and so on.

Note that FIG. 6 illustrates an open space with no obstacles. In a real-world environment, many direct transitions between locations are blocked by obstacles. Such obstacles can be taken into account by determining transition probabilities for transitions between locations (sample points). For example, a transition between two locations has a zero probability if the locations are separated by a wall or other obstacle, or if the transition requires a speed which the target device cannot achieve. Transition probabilities are further discussed later, under the heading "Recursion-based techniques".

The example shown in FIG. 6. suggests an alternative application for the invention. Instead of using the invention to calculate past locations of the target device, the invention can be used to improve the reliability of real-time location estimation. Because the invention can only be used if there is a known future, we must tolerate a delay of at least one observation. But, somewhat surprisingly, the introduction of a delay may improve the accuracy of the location estimation. Let us first assume that the target device's location is reported in real time, that is as soon as technically possible and without using future observations. In this case, the target device's location estimate is reported quickly, but the estimate can be grossly inaccurate. In contrast, if the inventive technique is used and a location estimate is only reported in respect of a location. for which at least one future observation is available, the location estimate is reported with a delay but the estimate is far less likely to be grossly inaccurate.

In the embodiment shown in FIG. 6, the target device's location is treated as a discrete variable. In other words, the target device is located at one or the discrete locations q1-1 through q3-8. A more advanced embodiment that treats the location as a continuous variable will. be described next.

In the example shown in FIG. 6, the transition from q1-1 to q3-3 was excluded because it would have required an impossibly high speed for the target device. A more formal expression is that the transition probability for such a transition is zero. If the transition probabilities between locations are known, the reliability of the model can be further improved. The transition probabilities can be determined experimentally or by simulation or by theoretical calculations.

Recursion-based techniques

Given a time-ordered sequence of observations $o_1^T = \{o_1, \ldots, o_T\}$ we want to determine the location distribution $q_t$ at time t, $1 \leq t \leq T$. Assume that an observation $o_i$ only depends on the current location $q_i$ and that $q_i$ only depends on the previous location $q_{i-1}$. The latter assumption means that history is not studied further than one prior observation. If these assumptions are met, we can represent the positioning problem as a hidden Markov model (HMM) of order 1 where $o_1^T$ is a sequence of observations and $q_1^T$ is a sequence of locations. In this case, the joint probability of $o_1^T$ and $q_1^T$ is:

$$P(o_1^T, q_1^T) = P(q_1)\Pi_{t=1 \ldots T-1} P(q_{t+1}|q_t) \Pi_{t=1 \ldots T} P(o_t|q_t) \quad [1]$$

The joint distribution is therefore completely specified in terms of
1. the initial state probabilities $P(q_1)$,
2. the transition probabilities $P(q_t|q_{t-1})$ and,
3. the observation probabilities $P(o_t|q_t)$.

If all locations are considered equally probable by default, we can simplify equation 1 by setting the initial state probability $P(q_1)$ same for all locations. Thus, the joint distribution depends only on the transition probabilities and observation probabilities. These probabilities can be defined in various ways. For example, transition probabilities can be based on the spatial distance between locations so that the transition probability approaches zero when the distance increases. Because the invention can be applied regardless on how transition and observation probabilities are determined, we assume from now on that the transition probabilities and the observation probabilities are given.

The location distribution at time t can be defined as:

$$P(q_t|o_1^T) = P(o_1^t, q_t) P(o_{t+1}^T|q_t)/P(o_1^T) \quad [2]$$

Herein $P(o_1^t, q_t)$ and $P(o_{t+1}^T|q_t)$ are obtained from equations 3 and 4 (forward and backward recursions) and $P(o_1^T)$ is the probability of the observations, used for normalizing. Let S be the set of possible locations in this model and n=|S| be the size of S. The time complexity of the forward and backward recursions is O(Tm) where T is the length of the history and m is the number of non-zero transition probabilities at each time step. Obviously, $m \leq n^2$ because in the worst case all transitions have non-zero probability. Most transitions have a probability of zero, however, so in practice $m << n^2$ which makes computation very fast.

$$P(o_1^t, q_t) = P(o_t|q_t) \Sigma_{qt-1} P(q_t|q_{t-1}) P(o_1^{t-1}, q_{t-1}) \quad [3]$$

$$P(o_{t+1}^T|q_t) = \Sigma_{qt+1} P(o_{t+1}|q_{t+1}) P(q_{t+1}|q_t) P(o_{t+2}^T|q_{t+1}) \quad [8]$$

In this way we can obtain the probabilities of different locations at a given time. However, many applications require a location estimate that is a single location instead of the location distribution. Again, there are several ways to calculate the point estimate at time t. For example, the point estimate can be a weighted average of locations where the location probability is used as the weight, or the location having the highest probability.

In order to find the most likely route, the Viterbi algorithm can be used. The Viterbi algorithm can find a sequence of locations $s_1, \ldots, s_T$ that it maximizes the probability $P(o_1^T|q_1=s_1, \ldots, q_T=s_T)$. Obviously, a location $s_t$ can be used as the location estimate at time t. However, this method has the drawback that at each time step, the location estimate can only be one of the possible locations. Thus, the accuracy of the location estimate depends on the density of possible locations. Accuracy could be improved by using large S having possible locations very close to each other. Unfortunately, this would radically increase time requirements of the algorithm.

In order to gain accurate location estimates with reasonable amount of computation, we can use relatively small S and calculate location estimate for time t as a weighted average of possible locations $\Sigma(w_i \cdot s_i)/\Sigma w_i$. The weight $w_i$ for a location $s_i$ can be defined as the probability of the most likely path that goes through location $s_i$ at time t. Path probabilities are obtained by using the Viterbi algorithm normally for time steps 1-t (creating forward paths) and backwards from time step T to t (creating backward paths) and multiplying the probabilities of forward and backward paths ending to $s_i$ for each i=1 ... n.

PERFORMANCE EXAMPLE

The following detailed calculations demonstrate how, at least in some situations, the invention can improve positioning accuracy even in real-time positioning. In some situations, the improvement may be significant. The following table 1 contains observation probabilities for locations A to F at (discrete) times t=1 to 5. Bold values show the observation probabilities of the real path A,B,D,E,F at each time step. Note that although the real location at time t=3 is D, location C has a higher observation probability. Hence, positioning based only on the current observation probabilities would fail at that point. Table 2 contains transition probabilities between locations A to F. Tables 3 to 5 contain normalized calculation results for forward, backward. and two-way recursions (equations 3, 4 and 2), respectively. Again, probabilities of real locations at each time step are shown in bold text. Table 6 shows probabilities for locations A to F at time t=3.

TABLE 1 observation probabilities:

| t | A | B | C | D | E | F |
|---|---|---|---|---|---|---|
| 1 | 0.6 | 0.2 | 0.08 | 0.1 | 0.01 | 0.01 |
| 2 | 0.2 | 0.62 | 0.1 | 0.05 | 0.02 | 0.01 |
| 3 | 0.08 | 0.15 | 0.45 | 0.3 | 0.01 | 0.01 |
| 4 | 0.01 | 0.01 | 0.1 | 0.2 | 0.58 | 0.1 |
| 5 | 0.01 | 0.01 | 0.1 | 0.05 | 0.1 | 0.73 |

TABLE 2 transition probabilities

| | To | | | | | |
|---|---|---|---|---|---|---|
| From | A | B | C | D | E | F |
| A | 0.5 | 0.5 | 0 | 0 | 0 | 0 |
| B | 0.2 | 0.4 | 0.2 | 0.2 | 0 | 0 |
| C | 0 | 0.5 | 0.5 | 0 | 0 | 0 |
| D | 0 | 0.3 | 0 | 0.4 | 0.3 | 0 |
| E | 0 | 0 | 0 | 0.3 | 0.4 | 0.3 |
| F | 0 | 0 | 0 | 0 | 0.5 | 0.5 |

TABLE 3 forward recursion:

| T | A | B | C | D | E | F |
|---|---|---|---|---|---|---|
| 1 | 0.6000 | 0.2000 | 0.0800 | 0.1000 | 0.0100 | 0.0100 |
| 2 | 0.1889 | 0.7750 | 0.0222 | 0.0115 | 0.0022 | 0.0002 |
| 3 | 0.0970 | 0.3056 | 0.3634 | 0.2337 | 0.0002 | 0.0000 |
| 4 | 0.0108 | 0.0417 | 0.2398 | 0.3054 | 0.4022 | 0.0001 |
| 5 | 0.0010 | 0.0165 | 0.0908 | 0.0889 | 0.1788 | 0.6239 |

TABLE 4 backward recursion:

| T | A | B | C | D | E | F |
|---|---|---|---|---|---|---|
| 1 | 0.1761 | 0.3818 | 0.1798 | 0.2156 | 0.0376 | 0.0090 |
| 2 | 0.0069 | 0.2892 | 0.0291 | 0.3573 | 0.2876 | 0.0300 |
| 3 | 0.0006 | 0.0202 | 0.0092 | 0.2584 | 0.4017 | 0.3099 |
| 4 | 0.0070 | 0.0740 | 0.0520 | 0.0520 | 0.4200 | 0.3950 |
| 5 | 0.1667 | 0.1667 | 0.1667 | 0.1667 | 0.1667 | 0.1667 |

TABLE 5 two-way recursion:

| T | A | B | C | D | E | F |
|---|---|---|---|---|---|---|
| 1 | 0.4838 | 0.3496 | 0.0659 | 0.0987 | 0.0017 | 0.0004 |
| 2 | 0.0056 | 0.9710 | 0.0028 | 0.0178 | 0.0027 | 0.0000 |
| 3 | 0.0008 | 0.0881 | 0.0476 | 0.8620 | 0.0012 | 0.0002 |
| 4 | 0.0004 | 0.0154 | 0.0622 | 0.0792 | 0.8426 | 0.0002 |
| 5 | 0.0010 | 0.0165 | 0.0908 | 0.0889 | 0.1788 | 0.6239 |

TABLE 6 probabilities for locations A to F at time t = 3

| Location | Forward | Backward | Two-way |
|---|---|---|---|
| A | 9.7% | 0.1% | 0.1% |
| B | 30.6% | 2.0% | 8.8% |
| C | 36.3% | 0.9% | 4.8% |
| D | 23.4% | 25.8% | 86.2% |
| E | 0.0% | 40.2% | 0.1% |
| F | 0.0% | 31.0% | 0.0% |

In this example, after making five observations, the best estimate for the target's location at the time of the third observation is D. The probability for D being the correct location is 86 percent, which is shown in bold text in table 6. But neither the forward nor the backward recursion alone cannot determine that D is the most likely location. Forward recursion shows that C and B are more likely locations than D. while the backward recursion prefers locations E and F. The two-way recursion virtually eliminates false location estimates.

It is readily apparent to a person skilled in the art that, as the technology advances, the inventive concept can be implemented in various ways. The invention and its embodiments are not limited to the examples described above but may vary within the scope of the claims.

The invention claimed is:

1. A method for estimating a target device's location, the method comprising:
maintaining a probabilistic model for a plurality of sample points, each sample point comprising a sample location and an expected distribution of signal values at that sample point;
making a sequence of observations $o_n$, n=1 . . . N, of signal values wherein each observation corresponds to a respective location $q_n$ along the target device's path, wherein the sequence of observations and the respective location constitute a hidden Markov model;
a location estimation module outputting a location estimate to an external apparatus, the location estimate estimating the target device's location $q_t$ based on the probabilistic model and the sequence of observations, wherein the sequence of observations comprises one or more future observations $o_{t+m}$ for which m is a positive integer, such that $t+m \leq N$.

2. A method according to claim 1, wherein the sequence of observations comprises one or more past observations $o_{n-m}$.

3. A method according to claim 2, further comprising estimating the target device's location $q_n$ based on:
a forward recursion of the one or more past observations; and
a backward recursion of the one or more future observations.

4. A method according to claim 2, further comprising estimating the transition probabilities and storing them with the probabilistic model before making the sequence of observations.

5. A method according to claim 1, further comprising estimating the target device's transition probabilities between the sample points and estimating the target device's location partially based on the transition probabilities.

6. A method according to claim 1, further comprising performing the location-estimating step in the target device.

7. A method according to claim 1, further comprising performing the location-estimating step in a fixed equipment to which the target device reports the sequence of observations via a radio network.

8. A method according to claim 1, wherein the at least one measurable signal value comprises signal strength.

9. A method according to claim 1, wherein the at least one measurable signal value comprises bit error rate or ratio.

10. A location estimation module for estimating a target device's location, the location estimation module comprising:
a probabilistic model for a plurality of sample points, each sample point comprising a sample location and an expected distribution of signal values at that sample point;
means for making a sequence of observations $o_n$, n=1 . . . N, of signal values, wherein each observation corresponds to a respective location $q_n$ along the target device's path, wherein the sequence of observations and the respective location constitute a hidden Markov model;
means for outputting a location estimate to an external apparatus, the location estimate estimating the target device's location $q_t$ based on the probabilistic model and the sequence of observations, wherein the sequence of observations comprises one or more future observations $o_{t+m}$ for which m is a positive integer, such that $t+m \leq N$.

11. A location estimation module according to claim 10, wherein the sequence of observations comprises one or more past observations $o_{n-m}$.

12. A location estimation module according to claim 11, further comprising means for estimating the target device's location $q_n$ based on:
- a forward recursion of the one or more past observations; and
- a backward recursion of the one or more future observations.

13. A location estimation module according to claim 10, further comprising means for estimating the target device's transition probabilities between the sample points and for estimating the target device's location partially based on the transition probabilities.

14. A location estimation module according to claim 10, further comprising means for estimating the transition probabilities and storing them with the probabilistic model before making the sequence of observations.

15. A location estimation module according to claim 10, wherein the location estimation module is configured to be located in the target device.

16. A location estimation module according to claim 10, wherein the location estimation module is configured to be located in a fixed equipment to which the target device reports the sequence of observations via a radio network.

17. A location estimation module according to claim 10, wherein the at least one measurable signal value comprises signal strength.

18. A location estimation module according to claim 10, wherein the at least one measurable signal value comprises bit error rate or ratio.

* * * * *